United States Patent Office 3,728,216
Patented Apr. 17, 1973

3,728,216
DIALLYLAMINE-AMIDE-POLYALDEHYDE RESINS HAVING UTILITY AS WET AND DRY STRENGTHENING AGENTS IN PAPERMAKING
Ralph A. Bankert, New Castle, Del., assignor to Hercules Incorporated, Wilmington, Del.
No Drawing. Filed Mar. 12, 1971, Ser. No. 123,865
Int. Cl. D21h 3/58; C08g 9/02
U.S. Cl. 162—167    15 Claims

ABSTRACT OF THE DISCLOSURE

Disclosed are resins prepared from a diallylamine, an amide and a polyaldehyde. The resins have the following repeating units

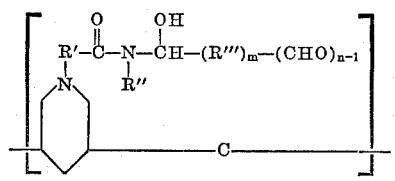

where R' is methylene or ethylene, R" is hydrogen or a lower alkyl radical, R''' is a saturated or unsaturated aliphatic, cycloaliphatic or aromatic radical, $m$ is 0 or 1 and $n$ is at least 2. Also disclosed is the process for the preparation of the resin and its use to impart dry and wet strength to paper.

---

This invention relates to wet strength resins, the process of incorporating them into paper and the paper so treated.

Various resins which impart wet strength to paper are known in the art. However, most of the prior art resins are of the permanent type, i.e., paper treated with them retains its wet strength long after immersion in water, which is desirable in packaging materials but presents a disposal problem. A few resins are known which impart temporary wet strength and would thus be suitable for sanitary or disposable paper uses, but each of them suffers from one or more serious drawbacks. For example, their wet strength efficiency is seriously decreased by alum, they are easily attacked by mold and slime, they can only be prepared as dilute suspensions or they must be sized into preformed paper because they are not substantive to pulp.

It is an object of this invention to provide resins which impart both dry and wet strength to paper.

It is a further object of this invention to provide wet strength resins such that paper treated with them loses its strength on prolonged immersion in water such as on disposal in sanitary systems, and facilitates the handling of broke in the paper mill.

It is further object of this invention to provide resins which impart their ultimate wet strength on drying alone without curng and are substantive to pulp without sizing.

It is a further object of this invention to provide wet strength resins which can be prepared in high solids concentrations.

It is a further object of this invention to provide wet strength resins which are not easily attacked by mold and slime growth.

It is a further object of this invention to provide wet strength resins which are more stable towards gelation on storage.

It is a further object of this invention to provide wet strength resins whose efficiency is not seriously reduced by alum.

Now in accordance with this invention these objectives and many others have been achieved by preparing wet strength resins from a diallylamine, an amide and a polyaldehyde as described below.

The wet strength resins of this invention are prepared by (1) reacting a diallylamine, either polymerized or a monomer, with an amide selected from the haloacetamides, acrylamide and alkyl substituted acrylamides (if the diallylamine has not been polymerized before reaction with an amide, it must be polymerized after such reaction) and (2) reacting the resulting adduct with an organic compound containing at least two free aldehyde groups.

As indicated above, the preparation of the wet strength resins of this invention can optionally be conducted with either poly(diallylamine) or diallylamine monomer. Actually one begins with the diallylamine monomer and ends with the resin by either route, as can be seen from the following

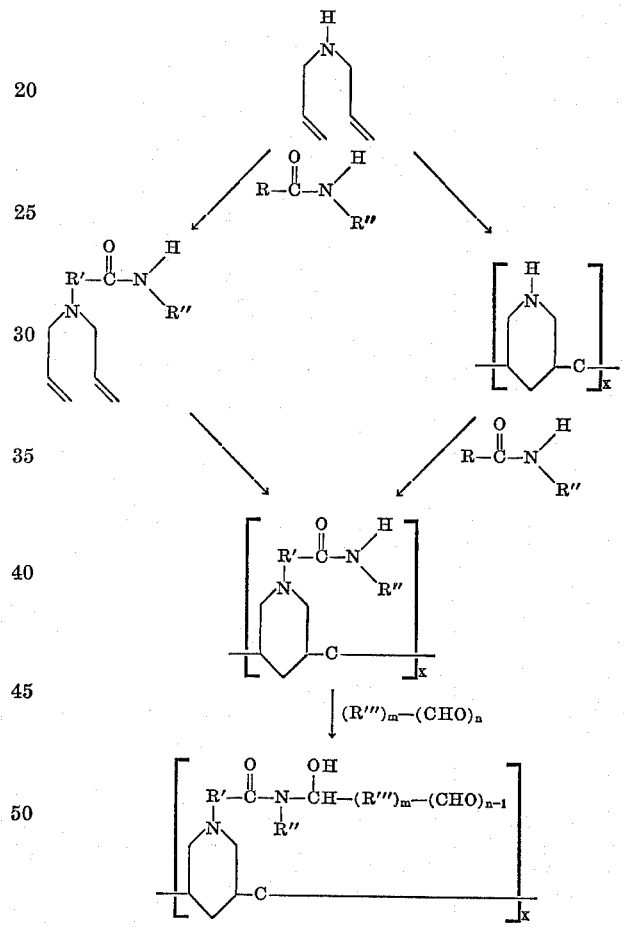

where R is selected from XCH$_2$— and CH$_2$=CH— radicals, where X is a halogen radical; R' is selected from methylene and ethylene radicals; R" is selected from hydrogen and lower alkyl radicals; R''' is selected from saturated and unsaturated aliphatic, cycloaliphatic and aromatic radicals; $x$ is at least 5, most preferably at least 10; $m$=0 or 1 and $n$ is at least 2.

As can be seen from the above equations, the reactions are similar whichever route is followed. By one route, the diallylamine is reacted with the amide and then polymerized. By the other route, the diallylamine is first polymerized and then reacted with amide. In either case the polymerization is initiated by a conventional free radical generator such as a peroxide, as for example t-butyl-hydroperoxide or hydrogen peroxide. For best results the material to be polymerized will be in the form of the hydrochloride salt.

The reactions of the diallylamine or poly(diallylamine) with the amide will generally be carried out in solution. As stated above the amide will be selected from the haloacetamides - chloroacetamide, fluoroacetamide, bromoacetamide and iodoacetamide; acrylamide; and alkyl substituted acrylamides such as methacrylamide, α-ethylacrylamide and crotonamide.

Most preferably, a sufficient amount of the amide will be used to react with substantially all of the amine groups in the diallylamine or poly(diallylamine). The reaction between the amide and diallylamine or poly(diallylamine) can be carried out at any temperature between about 20° C. and the boiling point of the reaction mixture at the solids concentration used. Temperatures between about 40° C. and about 80° C. are most preferred. A high pH during the reaction is favored since this frees the amine groups from their salts.

The final reaction in the preparation of the wet strength resins of this invention is between the diallylamine—amide adduct and an organic compound containing at least two free aldehyde groups (i.e. a polyaldehyde). Typical polyaldehydes which may be used in the final reaction are glyoxal, malonic aldehyde, succinic aldehyde, glutaraldehyde, adipic aldehyde, 2-hydroxyadipaldehyde, pimelic aldehyde, suberic aldehyde, azelaic aldehyde, sebacic aldehyde, maleic aldehyde, fumaric aldehyde, polyacrolein, phthalaldehyde, isophthalaldehyde, terephthalaldehyde, 1,3,5-triformylbenzene, and 1,4-diformylcyclohexane. This reaction is generally carried out at a pH of from about 7 to about 10 and a temperature in the range of from about 20 to 80° C. Mole ratios of polyaldehyde to amide in the diallylamine—amide adduct will be between about 0.05 and about 5.0, most preferably between about 0.1 to about 3.0.

When using the wet strength resins of this invention in papermaking, they can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking it will be preferred to add the resin at the fan pump or head box in the form of an aqueous solution of up to 15% solids. Various amounts of the resin can be used. When used to impart wet strength, the amount of resin added will be sufficient to result in a paper containing from about 0.05% to about 5% by weight based on the weight of the paper. The actual amount for any specific purpose can be easily determined by one skilled in the art. As stated above, no heat curing is required with the resins of the instant invention since they develop their optimum strength on normal drying. They can be added to paper over a wide range of pH values. However, best results are obtained by adding the resin to the paper at an acid pH of from about 1 to about 8 most preferably from about 3 to about 6.5.

Other ingredients can be used in conjunction with the wet strength resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the wet strength resins of this invention.

It will be obvious to those skilled in the art that the wet strength resins of this invention can be incorporated into various types of paper such as kraft paper, sulfite paper, semi-chemical paper, etc. both bleached and unbleached. While the resins can be used in various types of paper, their advantages will be most sought in paper toweling or paper tissues such as toilet and facial tissues.

The following examples will serve to illustrate the invention, parts and percentages being by weight unless otherwise indicated.

EXAMPLE 1

This example shows the preparation of and use in papermaking of a typical wet strength resin in accordance with this invention.

To 194 parts of diallylamine in about 900 parts of ethylacetate is added 93.5 parts of chloroacetamide. The resulting mixture is heated gradually to 78° C. and held at reflux for 1 hour. After cooling and standing overnight diallylamine·HCl crystals form and are removed by filtration. The filtrate is concentrated by flash evaporation and the product purified by vacuum distillation and recrystallization. The resulting acetamidodiallylamine has a melting point of 78–80° C. Approximately 150 parts of the acetamidodiallylamine is dissolved in 860 parts of methylene chloride and cooled in an ice bath. Hydrogen chloride gas is bubled through the solution for 30 minutes and the acetamidodiallylamine·HCl precipitates. The precipitate is dissolved in water to give a 50% total solids solution. The acetamidodiallylamine·HCl solution is heated to 70° C., flushed with nitrogen and polymerized by adding 2 parts per hundred of t-butylhydroperoxide, based on the acetamidodiallylamine·HCl. After 24 hours at 70° C., under an atmosphere of nitrogen, the solution has turned an amber color and its viscosity has increased. The polymer solution is diluted to 30% total solids with water and the pH adjusted to 7.5 with sodium hydroxide. Then 40% aqueous glyoxal is added to the polymer solution in a 1:1 mole ratio. The resulting reaction mixture is heated to about 45° C. and the viscosity monitored until it reaches a Gardner-Holdt value of approximately D. The pH of the resin solution is adjusted to 3 with hydrochloric acid and dilution water added to give a total solids of 5%. After storage for 90 days at room temperature a sample of the wet strength resin solution shows no signs of mold or slime.

Rayonier bleached kraft pulp is beaten in a cycle beater to a Schopper-Riegler freeness of 750 cc. Portions of this pulp, adjusted to a pH of 6.5 with sulfuric acid, are added to the proportioner of a Noble-Wood handsheet forming machine. Samples of the above wet strength resin are added to the proportioner in amounts of 0.25%, 0.5%, 1%, and 2% resin solids by weight of pulp solids. The pulp is then formed into handsheets of about 40 pounds per 3,000 square foot basis weight and dried for one minute at a temperature of 110° C. A control handsheet is prepared exactly as described above except it contains no wet strength resin. The resulting handsheets after conditioning at a temperature of 75° F. and 50% relative humidity for over 24 hours are tested for dry tensile strength and wet tensile strength after soaking for 10 seconds in distilled water. The wet tensile strength and dry tensile strength are tabulated below:

| Percentage of resin contained in paper | Tensile strength, lbs./in. width | |
|---|---|---|
| | Dry | Wet |
| 0.25 | 22.7 | 0.91 |
| 0.5 | 24.3 | 1.33 |
| 1.0 | 23.2 | 1.73 |
| 2.0 | 23.6 | 2.14 |

Another set of handsheets are prepared exactly as described above except the pulp is adjusted to a pH of 4.5. The resulting handsheets are tested as described above and the results are tabulated below:

| Percentage of resin contained in paper | Tensile strength, lbs./in. width | |
|---|---|---|
| | Dry | Wet |
| 0.25 | 22.6 | 2.54 |
| 0.5 | 24.6 | 3.56 |
| 1.0 | 23.2 | 3.82 |
| 2.0 | 23.9 | 5.51 |

EXAMPLE 2

This example shows the preparation and use of another typical wet strength resin in accordance with this invention.

A poly(diallylamine·HCl) having a reduced specific viscosity of 0.18, as determined in 1 molar NaCl solution at 25° C. and amounting to 40.25 parts is dissolved in 65 parts of water. The resulting viscous red-brown solution having a pH of 1.0 is adjusted with aqueous sodium hydroxide, added dropwise, to a final pH of 12.4. To the polymer solution is added 28 parts of chloroacetamide and 29 parts of water. The resulting mixture is heated to 52–53° C. for 6 hours. The poly(acetamidodiallylamine·HCl) solution is adjusted to a pH of 7.5 with sodium hydroxide and then treated with 42 parts of 40% aqueous glyoxal and 126 parts of water. The reaction mixture is heated to 35–36° C. for 10 minutes while maintaining the pH at approximately 7.5. The resulting wet strength resin solution is diluted with water to a total solids of 11.9% and the pH adjusted to 3.5. After storage for 90 days at room temperature a sample of the wet strength resin solution shows no signs of mold or slime.

Bleached Kraft paper is prepared using the above wet strength resin with 2.5% alum and without alum as described in Example 1. Samples of the thus prepared paper are tested for dry and wet tensile strength also as described in Example 1. The results are tabulated below:

| Percentage of resin contained in paper [1] | Tensile strength, lbs./in. width | |
|---|---|---|
| | Dry | Wet |
| 0.25 | 20.4 | 2.04 |
| 0.5 | 22.1 | 2.82 |
| 1.0 | 22.8 | 3.82 |
| 2.0 | 23.2 | 4.57 |

[1] Without alum.

| Percentage of resin contained in paper [1] | Tensile strength, lbs./in. width | |
|---|---|---|
| | Dry | Wet |
| 0.25 | 21.0 | 2.58 |
| 0.5 | 22.6 | 3.46 |
| 1.0 | 22.8 | 4.54 |
| 2.0 | 23.8 | 5.48 |

[1] With alum.

EXAMPLE 3

This example shows the preparation and use of a wet strength resin prepared from diallylamine, acrylamide and glyoxal.

To a mixture of 71 parts acrylamide and 71 parts of water is added 97 parts of diallylamine, dropwise over a period of 35–40 minutes at a temperature of approximately 40° C. After the amine has been added the resulting amber solution is maintained at 60° C. for six hours with stirring. To 47.7 parts of the resulting β-propionamidodiallylamine solution is added 19.4 parts of concentrated hydrochloric acid and 0.88 part per hundred of 1-butylhydroperoxide, based on the propionamidoodiallylamine·HCl. After 24 hours at 60° C. under an atmosphere of nitrogen the solution turns a dark red and becomes viscous. Then 59.4 parts of the resulting polymer solution is diluted to 10% solids with water and the pH adjusted to 7.5 with sodium hydroxide. After adding 25.5 parts of 40% aqueuos glyoxal the mixture is heated to 40° C. over a period of 35 minutes. The pH of the resulting resin solution is adjusted to 4.5 by the addition of sulfuric acid yielding a final product containing 11.6% solids. After storage for 90 days at room temperature a sample of the wet strength resin solution shows no signs of mold or slime.

Bleached Kraft paper is prepared using the above wet strength resin as described in Example 1. Samples of the thus prepared paper are tested for dry and wet tensile strength also as described in Example 1. The results are tabulated below:

| Percentage of resin contained in paper | Tensile strength, lbs./in. width | |
|---|---|---|
| | Dry | Wet |
| 0.25 | 16.4 | 1.40 |
| 0.5 | 16.8 | 2.10 |
| 1.0 | 18.4 | 2.62 |
| 2.0 | 18.0 | 3.08 |

EXAMPLE 4

This example shows the preparation and use of a wet strength resin prepared from diallylamine, bromoacetamide and glyoxal.

To 97 parts of diallylamine and about 450 parts of ethylacetate is added 69 parts of bromoacetamide. The resulting mixture is heated gradually to 79° C. and held at reflux for one hour. Upon cooling and standing overnight diallylamine·HBr crystals form and are removed by filtration. The filtrate is concentrated by flash evaporation and the product purified by vacuum distillation and recrystallization. Approximately 75 parts of the acetamidodiallylamine is dissolved in 430 parts of methylene chloride and cooled in an ice bath. Hydrogen chloride gas is bubbled through the solution for 30 minutes and the acetamidodiallylamine·HCl precipitates. The precipitate is dissolved in water to give a 50% total solids solution. The acetamidodiallylamine·HCl solution is heated to 70° C. flushed with nitrogen and polymerized by adding two parts per hundred of t-butylhydroperoxide, based on the acetamidodiallylamine·HCl. After 24 hours at 70° C. under an atmosphere of nitrogen the solution has turned an amber color and its viscosity has increased. The polymer solution is diluted to 30% total solids with water and the pH adjusted to 7.5 with sodium hydroxide. Then 40% aqueous glyoxal is added to the polymer solution in a 1:1 mole ratio. The resulting reaction mixture is heated to about 45° C. and the viscosity monitored until it reaches a Gardner-Holdt value of approximately F. The pH of the resin solution is adjusted to 3 with hydrochloric acid and diluted with water to give a total solids of 6%. After storage for 90 days at room temperature a sample of the wet strength resin solution shows no signs of mold or slime.

Bleached kraft paper is prepared using the above wet strength resin as described in Example 1. Samples of the thus prepared paper are tested for dry and wet tensile strength also as described in Example 1. The results are substantially the same as the results using the wet strength resin of Example 1.

EXAMPLE 5

This example shows the preparation and use of a wet strength resin prepared from diallylamine, methacrylamide and glutaraldehyde.

To a mixture of 85 parts of methacrylamide and 85 parts of water is added dropwise 97 parts of diallylamine with stirring. During the addition of the diallylamine the temperature is maintained in the range of 40–60° C. The reaction mixture is then heated at 60–65° C. for six hours followed by cooling to room temperature. To 67 parts of the resulting solution is added 24.4 parts of concentrated hydrochloric acid and 3.0 parts t-butylhydroperoxide. After two hours at 60° C. under an atmosphere of nitrogen, the solution becomes viscous. Then 75 parts of the resulting poly(β-2-metylpropionamidodiallylamine·HCl)

solution is adjusted to a pH of 7.5 wtih sodium hydroxide and 40% aqueous glyoxal added in a 1:1 mole ratio. The resulting reaction mixture is heated to about 40° C. for a period of 35 minutes. The resulting viscous resin solution is adjusted to a pH of 3 and diluted with water to a total solids of 10%. After storage for 90 days at room temperature a sample of the wet strength resin solution shows no signs of mold or slime.

Bleached kraft paper is prepared using the above wet strength resin as described in Example 1. Samples of the thus prepared paper are tested for dry and wet tensile strength also as described in Example 1. The results are substantially the same as the results using the wet strength resin of Example 1.

What I claim and desire to protect by Letters Patent is:

1. A diallylamine-amide-polyaldehyde resin having the following repeating units

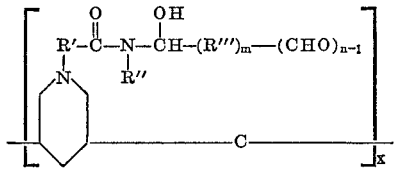

where R' is selected from methylene and ethylene radicals, R" is selected from hydrogen and lower alkyl radicals, R''' is selected from saturated and unsaturated aliphatic, cycloaliphatic and aromatic radicals, $m$ is 0 or 1, $n$ is at least 2 and $x$ is at least 5.

2. The product of claim 1 wherein the amide is acrylamide and the polyaldehyde is glyoxal.

3. The process of preparing a diallylamine-amide-polyaldehyde resin which comprises the steps of
   (1) reacting a poly(diallylamine) with an amount of an amide, selected from haloacetamides, acrylamide and lower alkyl substituted acrylamides, sufficient to react with substantially all of the amine groups in the poly(diallylamine) and
   (2) reacting the resulting poly(diallylamine-amide) adduct with from about 0.05 to about 5.0 moles of an organic compound containing at least two free aldehyde groups per mole of amide present in said adduct.

4. The process of claim 3 wherein the amide is a haloacetamide.

5. The process of claim 4 wherein the haloacetamide is chloroacetamide.

6. The process of claim 3 wherein the organic compound containing at least two free aldehyde groups is glyoxal.

7. The process of preparing a diallylamine-amide-polyaldehyde resin which comprises the steps of (1) reacting diallylamine with an amount of an amide, selected from haloacetamides, acrylamide and lower alkyl substituted acrylamides, sufficient to react with substantially all of the amine groups in the diallylamine,
(2) polymerizing the resulting diallylamine-amide adduct in the presence of a free radical generator and
(3) reacting the resulting poly(diallylamine-amide) adduct with from about 0.05 to about 5.0 moles of an organic compound containing at least two free aldehyde groups per mole of amide present in said adduct.

8. The process of claim 7 wherein the amide is a haloacetamide.

9. The process of claim 8 wherein the haloacetamide is chloroacetamide.

10. The process of claim 7 wherein the amide is acrylamide.

11. The process of claim 7 wherein the organic compound containing at least two free aldehyde groups is glyoxal.

12. A paper treating composition comprising an aqueous solution of up to 15 percent solids by weight based on the weight of the water of a diallylamine-amide-polyaldehyde resin defined in claim 1.

13. Paper treated with from about 0.05% to about 5% by weight based on the weight of the paper of a diallylamine-amide-polyaldehyde resin defined in claim 1 to impart wet strength.

14. The process of treating paper to impart wet strength which comprises treating said paper with from about 0.05% to about 5% by weight based on the weight of the paper of a diallylamine-amide-polyaldehyde resin defined in claim 1 and allowing the treated paper to dry.

15. The process of claim 14 wherein said treating is conducted during the formation of said paper.

References Cited
UNITED STATES PATENTS

| | | | |
|---|---|---|---|
| 3,607,622 | 9/1971 | Espy | 162—167 |
| 3,556,932 | 1/1971 | Coscia et al. | 162—166 |
| 2,886,557 | 5/1959 | Talet | 260—72 R |
| 3,234,076 | 2/1966 | Goldsmith | 162—168 |

S. LEON BASHORE, Primary Examiner

F. FREI, Assistant Examiner

U.S. Cl. X.R.

162—164; 260—29.4 R, 29.4 UA, 17.3 R, 72 R